(12) United States Patent
Phadke (10) Patent No.: US 9,195,655 B2
(45) Date of Patent: Nov. 24, 2015

(54) METHOD AND SYSTEM FOR TRANSFORMING DOCUMENTS

(71) Applicant: Lingua Next Technologies Pvt. Ltd., Pune (IN)

(72) Inventor: Rajeevlochan Phadke, Pune (IN)

(73) Assignee: Lingua Next Technologies Pvt. Ltd., Maharashtra (IN)

(*) Notice: Subject to any disclaimer, the term of this patent is extended or adjusted under 35 U.S.C. 154(b) by 164 days.

(21) Appl. No.: 14/033,743

(22) Filed: Sep. 23, 2013

(65) Prior Publication Data

US 2015/0088488 A1 Mar. 26, 2015

(51) Int. Cl.
*G06F 17/28* (2006.01)
*G06F 17/21* (2006.01)
*G06F 17/22* (2006.01)

(52) U.S. Cl.
CPC ............ *G06F 17/289* (2013.01); *G06F 17/211* (2013.01); *G06F 17/2294* (2013.01)

(58) Field of Classification Search
CPC ............ G06F 17/2264; G06F 17/2809; G06F 17/2872; G06F 17/2881; G06F 17/2818; G06F 17/2735
USPC .................................. 704/7, 2, 3, 4; 707/513
See application file for complete search history.

(56) References Cited

U.S. PATENT DOCUMENTS

2008/0288239 A1* 11/2008 Bailey et al. ...................... 704/2

* cited by examiner

*Primary Examiner* — Charlotte M Baker
(74) *Attorney, Agent, or Firm* — Greenberg Traurig, LLP (57) ABSTRACT

A method and system for transforming a source document to an output document is disclosed. The method includes preparing a first file that contains a fixed text and a variable text by generating a regular-expression code for the text in the source document. The variable text in the first file is translated from a source language to an output language, wherein the translation is performed on the basis of at least one of a translation dictionary look-up, and a phonetic transliteration. The method then generates the output document in a pre-decided format as required in the output document from the first file.

17 Claims, 5 Drawing Sheets

METHOD AND SYSTEM FOR TRANSFORMING DOCUMENTS

FIELD

The invention relates generally to report generation. More specifically, the invention relates to the translation of text in a report from one language to another language or to multiple languages in the same report.

BACKGROUND

Globalization of businesses around the world has created a need for business applications to be able to support localization. Diverse regional differences within one country necessitate that official documents be produced in more than one language so that native customers can easily comprehend the documents. This has created a need to translate original documents into one or more output languages.

However, there are multiple problems that are faced with translation of original documents. Some of these problems are related to the formatting of the output report. Due to the difference in the letter size of monospaced and non-monospaced fonts in different languages, it becomes difficult to maintain the formatting of the output report. The translation of the report into a different language is also a cumbersome task in itself. The reports can be translated by using a language expert. However, the language expert will not be able to provide a correct output format of the report, and more importantly, it would not be an automated process, making the exercise expensive. Another way of translating documents is machine translation. However, the accuracy problems of machine-translated documents are widely known.

Thus, there is a need for a solution to efficiently translate documents in an automated fashion and alleviate the above-mentioned problems.

SUMMARY

According to embodiments illustrated herein, there is provided a method for transforming a first document in a first language to a second document in a second language, wherein the first document includes a fixed text and a variable text. The method includes receiving a request for the second document. Thereafter, a unique identifier of the first document is retrieved. A first file is retrieved on the basis of the unique identifier, wherein the first file is prepared by generating a regular-expression (reg-ex) code for the fixed text and the variable text in the first document, and wherein the first file includes a translation of the fixed text into a second language and is in a pre-decided format. Furthermore, translation of the variable text from the first language to the second language is performed on the basis of at least one of a translation dictionary look-up and a phonetic transliteration. The second document is then generated on the basis of the first file and the at least one of the phonetic transliteration and the translation dictionary look-up.

According to embodiments illustrated herein, there is provided a report generation system for transforming a first document in a first language to a second document in a second language, wherein the first document includes a fixed text and a variable text. The system has a memory that includes one or more program instruction modules. The program instruction modules are a receiver module, a template module, a regular-expression (reg-ex) identifier, a mapping module, a translator module, a generation module, and a print module. The receiver module receives the first document, wherein the first document has a unique identifier. The template module retrieves a first file on the basis of the unique identifier, wherein the first file is prepared by generating a regular-expression (reg-ex) code for the fixed text and the variable text in the first document, and wherein the first file comprises a translation of the fixed text into a second language and is in a pre-decided format. The regular-expression identifier identifies one or more unique instances of the generated reg-ex code in the first file. The mapping module maps the generated reg-ex code in the first file to a layout of the second document, wherein the layout of the second document corresponds to at least one of a page fitment, a column representation, a font property, and the like. The translator module performs translation of the variable text from the first language to the second language, wherein the translation is performed on the basis of at least one of a translation dictionary look-up and a phonetic transliteration. The generation module generates the second document on the basis of the first file and the translated variable text. The print module gives instructions to print the generated second document.

According to embodiments illustrated herein, there is provided a computer program product for use with a computer. The computer program product includes a non-transitory computer-readable medium storing a computer-readable program code for transforming a first document in a first language to a second document in a second language, wherein the first document comprises a fixed text and a variable text. The computer-readable program code includes program instructions for retrieving a unique identifier of the first document. The computer-readable program code includes program instructions for retrieving a first file on the basis of the unique identifier, wherein the first file is prepared by generating a regular-expression code for the fixed text and the variable text in the first document, and wherein the first file comprises a translation of the fixed text into a second language and is in a pre-decided format. The computer-readable program code includes program instructions for performing translation of the variable text from the first language to the second language, wherein the translation is performed on the basis of at least one of a translation dictionary look-up and a phonetic transliteration. The computer-readable program code further includes program instructions for generating the second document on the basis of the first file and the at least one of the phonetic transliteration and the translation dictionary look-up.

BRIEF DESCRIPTION OF DRAWINGS

The following detailed description of the embodiments of the disclosure will be better understood when read with reference to the appended drawings. The disclosure is illustrated by way of example, and is not limited by the accompanying figures, in which like references indicate similar elements.

DETAILED DESCRIPTION

The present disclosure can be best understood when read with reference to the detailed figures and description set forth herein. Various embodiments are discussed below with reference to the figures. However, those skilled in the art will readily appreciate that the detailed description given herein with respect to these figures is just for explanatory purposes as methods and systems of the disclosure extend beyond the described embodiments. For example, those skilled in the art will appreciate that in light of the teachings presented multiple alternative and suitable approaches can be recognized depending on the needs of a particular application to implement the functionality of any detail described herein.

References to "one embodiment", "at least one embodiment", "an embodiment", "one example", "an example", "for example" and so on, indicate that the embodiment(s) or example(s) so described may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment, although it may.

DEFINITIONS

The following terms shall have, for the purposes of this application, the respective meanings set forth below.

A "network" refers to a medium that interconnects various computing devices, an application server and a database server. Examples of the network include, but are not limited to, Local Area Network (LAN), Wireless Local Area Network (WLAN), Metropolitan Area Network (MAN), Wide Area Network (WAN), and the Internet. Communication over the network may be performed in accordance with various communication protocols such as Transmission Control Protocol and Internet Protocol (TCP/IP), User Datagram Protocol (UDP), and IEEE 802.11n communication protocols.

A "regular expression code" (Reg-ex code) refers to a specific pattern in which a text may be represented in the form of strings of text, such as particular characters, words, or patterns of characters. In an embodiment, a reg-ex engine may be used to identify and manipulate the text in a document to form patterns based on the reg-ex code defined in the text.

A "source document" refers to the first document received from a source system for which a relevant second document is to be generated. In an embodiment, the report generation system receives the first document in a first language and may need to transform it to the second document in one or more second languages. The second document would hereinafter be referred to as an output document. Further, the source document may be in a plain text format and may need to be converted to a rich-text format. Hereinafter, "first language" may be interchangeably used with "source language" and "second language" may be interchangeably used with "output language".

"Fixed text" refers to a text in the first document that remains constant in each output document generated from the first document.

"Variable text" refers to a text in the first document that varies on the output document based on the format and translation requirements of the output document.

A "rich-text template" (RTT) refers to a first file created from the first document that contains a fixed text and a variable text. The RTT includes a translation of the fixed text into one or more output languages of one or more output documents. The RTT includes various placeholders for the variable text and its location in the source document. Further, the RTT also includes the formatting prescribed for the output report.

A "report identifier" or "report ID" refers to a unique code contained in the source document that uniquely identifies an RTT corresponding to the source document. For example, the report ID may correspond to a report header or to information contained in the report header of the source document to be converted, and the corresponding RTT will also be stored with the same report ID so that it can be easily matched with the source document and made available for print.

"Shaping" refers to the process wherein the translated content is formatted based on the requirement of the output document. In an embodiment, the translated content is formatted for a layout of the output document which may include, but is not limited to, page size fitment, and alignment in which the output document is to be printed.

A "run-time engine" or "(RT engine)" refers to a system that is pre-programmed with reg-ex codes. The RT engine provides a matching reg-ex code for a selected line of text in the source document containing the fixed text and the variable text.

"Design-time" refers to the phase of creating the RTT from the source document for the output document.

"Run-time" refers to the time when a request is received for the source document to be printed in the output language, a matching RTT of the source document is found, and the source document is converted to the output document.

Figure 1:
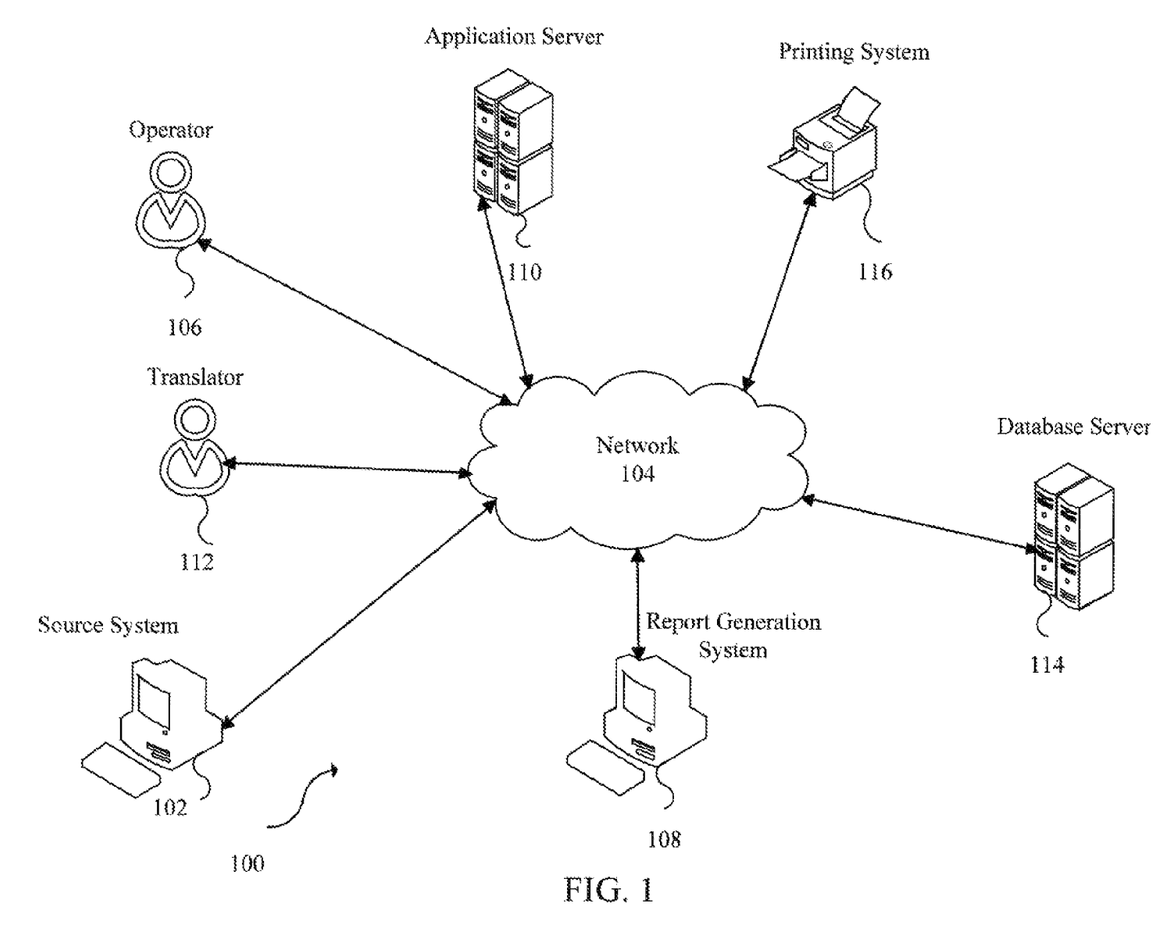
FIG. 1 illustrates a system environment in which various embodiments may be implemented.

FIG. 1 illustrates a system environment 100 in which various embodiments may be implemented. The system environment 100 includes a source system 102, a network 104, an operator 106, a report generation system 108, an application server 110, a translator 112, a database server 114, and a printing system 116.

Although FIG. 1 shows only one type of source system 102 for simplicity, it will be apparent to a person having ordinary skill in the art that the disclosed embodiments may be implemented for a variety of computing devices including, but not limited to, a desktop computer, a laptop, a personal digital assistant (PDA), a tablet computer (e.g., iPad®, Samsung Galaxy Tab®, etc), and the like.

The source system 102 is a device or computer that sends a source document to be transformed into an output document. In an embodiment, the source system 102 sends the source document to the report generation system 108 over the network 104.

The operator 106 retrieves the source document from the report generation system 108 and creates the reg-ex code for each line of text contained in the source document by interpreting the characters in the text (e.g., letters, numerics, alphanumerics, etc.). The reg-ex code is created on the report generation system 108. During the creation of the reg-ex code for each line, the operator 106 defines the fixed text and the variable text of the source document. In an embodiment, the operator 106 defines placeholders in the RTT for the variable text. The operator 106 may also define the type of formatting required to transform the source document to the output document. In an embodiment, the type of formatting is set manually by a human.

The report generation system 108 converts the RTT of the source document into the output document. During a run-time, the report generation system 108 transforms the source document to provide a translated and a formatted output document using the RTT of the source document.

In another embodiment, the application server 110 may host the application/tool to help the operator 106 to create the RTT of the source document during the design time. At runtime, the application/tool is executed by the application server 110 and provides the RTT to the report generation system 108.

The translator 112 translates the fixed text in the RTT defined by the operator 106 into the output language, while the variable text in the RTT is translated by the report generation system 108. The report generation system 108 is discussed in detail in regard to FIG. 2. In an embodiment, for example, the translator 112 may be a domain expert person. In an embodiment, the translator 112 receives the request from the report generation system 108 or the application server 110 via the network 104 and then translates the fixed text of the RTT to the output language. The fixed text is translated without formatting or shaping and is replaced by the corresponding translated text.

The database server 114 may host a file which has one or more records of one or more previously created RTTs for other source documents. In an embodiment, different source documents will be received and a translated and formatted output document for those will have to be generated. It will be appreciated by a person having ordinary skill in the art that different source documents may have some similar text. For example, a letter of congratulations and a promotion letter may both have the first line of text as "we would like to congratulate you upon . . . " The reg-ex code once defined for this line may then be re-used for other source documents that have the same line of text. In an embodiment, the database server 114 also stores the reg-ex codes that have been generated for each line of text in multiple source documents. Upon receipt of a new source document, the previously stored reg-ex codes will be considered to ascertain a match.

The printing system 116 receives the output document generated by the report generation system 108 and prints it in the required format. In an embodiment, for example, if the expected output document is in a text format, the printing system 116 may be a dot matrix printer. In another example, if the expected output document is in a graphics format, the printing system may be a dot matrix, ink-jet, or laser printer.

Figure 2:
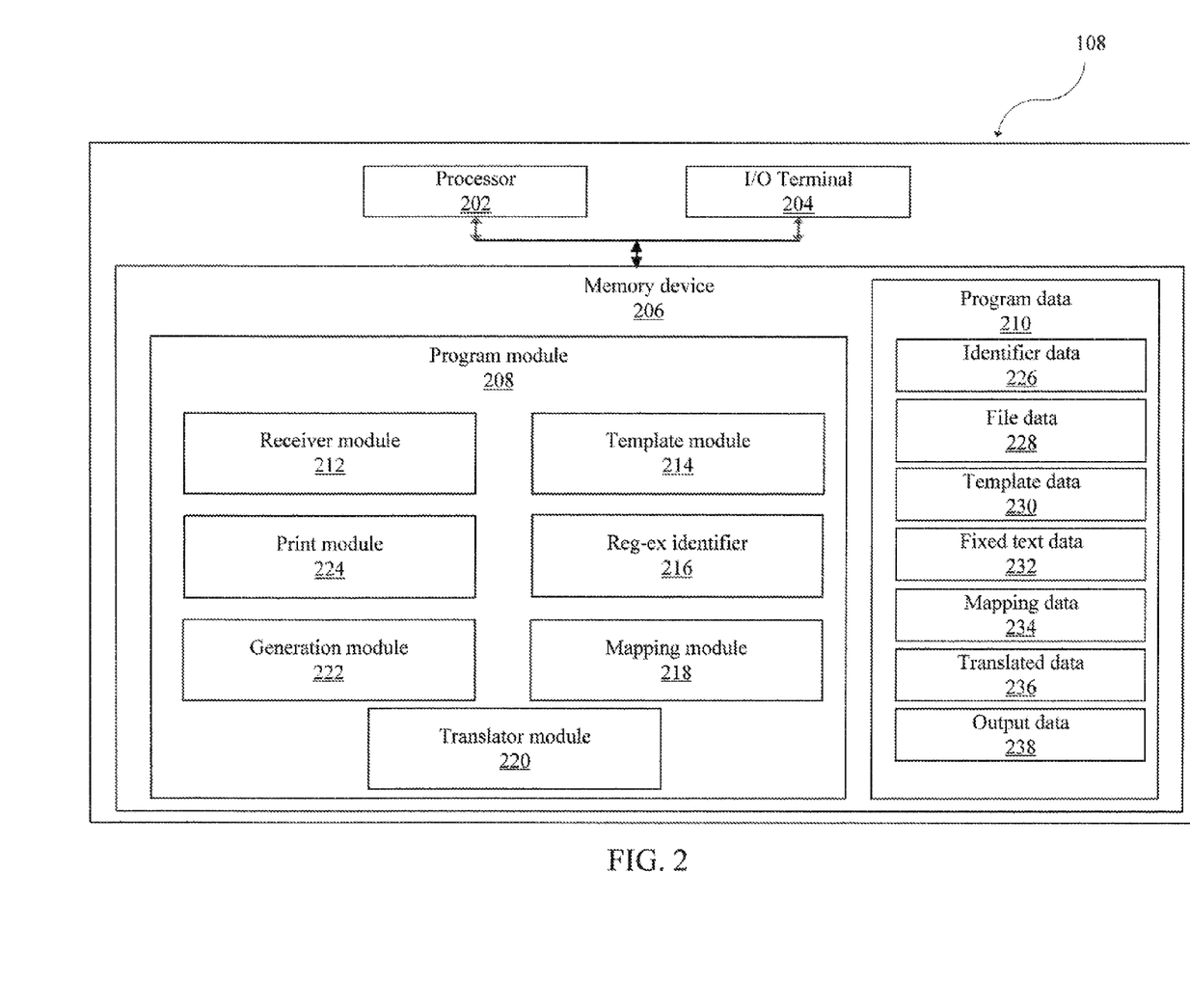
FIG. 2 is a block diagram of a report generation system in accordance with an embodiment.

FIG. 2 is a block diagram of the report generation system 108 in accordance with an embodiment. The report generation system 108 includes a processor 202, an input/output (I/O) terminal 204, and a memory device 206.

The processor 202 is coupled to the I/O terminal 204 and the memory device 206. The processor 202 is configured to fetch a set of instructions stored in the memory device 206 and execute the set of instructions. The processor 202 may be realized through a number of processor technologies known in the art. Examples of the processor 202 include, but are not limited to, X86 processor, RISC processor, ASIC processor, CSIC processor, or any other microprocessor. The I/O terminal 204 is configured to receive an input from a user (operating the source system 102), the translator 112, and the operator 106. Examples of the I/O terminal 204 may include, but are not limited to, a keyboard, a mouse, a joystick, a gamepad, a stylus, a touch screen, and/or the like.

The memory device 206 is configured to store data and a set of instructions (arranged as program instruction modules, a program instruction module representing a set of program instructions for an intended purpose/functionality). Some of the commonly known memory device implementations can be, but are not limited to, a random access memory (RAM), read only memory (ROM), a hard disk drive (HDD), and a secure digital (SD) card. The memory device 206 includes a program module 208 and a program data 210. The program module 208 includes a set of instructions that may be executed by the processor 202 to perform specific actions on the report generation system 108. The program module 208 further includes a receiver module 212, a template module 214, a regular-expression (reg-ex) identifier 216, a mapping module 218, a translator module 220, a generation module 222, and a print module 224. Although various modules in the program module 208 have been shown in separate blocks, it may be appreciated that one or more of the modules may be implemented as an integrated module performing the combined functions of the constituent modules.

The program data 210 includes an identifier data 226, a file data 228, a template data 230, a fixed text data 232, a mapping data 234, a translated data 236, and an output data 238.

The receiver module 212 receives a request from the user on the source system 102 through the I/O terminal 204 to transform the source document to the output document. The receiver module 212 identifies the report ID of the source document and matches it with the identifier data 226.

The template module 214 retrieves the RTT of the source document from the file data 228 by ascertaining a match between the report ID of the source document and an ID of the stored RTT files. In an embodiment, the ID for the stored RTT files is stored as the identifier data 226. The template module 214 saves the information of one or more data types associated with the variable text of the source document provided by the operator 106 in the template data 230.

During the design time, the operator 106 opens the source document and defines the reg-ex code for the entire source document by screening the source document line by line. In an embodiment, the operator 106 may screen through multiple lines to define the reg-ex code for the variable text. While defining the reg-ex code, the operator 106 selects a line for which the reg-ex code is to be defined. The application/tool may provide the operator 106 with matching reg-ex codes for similar or identical text found in the selected line. In an embodiment, the operator 106 defines the placeholder locations and the space requirements of the variable text. The variable text in the RTT may be represented by special characters by the operator 106. The template module 214 scans the placeholder locations and the space requirements of the variable text in the RTT and compares the variable text in the RTT with the variable text in the source document and identifies the data type of the variable text. For example, special character $ may represent any numeral from 0-9. If the variable text in the RTT is in the format "$$/$$/$$" then by looking up the one or more records in the RT engine the data type of the variable text is found, which is the date. The process of defining the RTT will be discussed in the detail in regard to FIG. 3.

Figure 3:
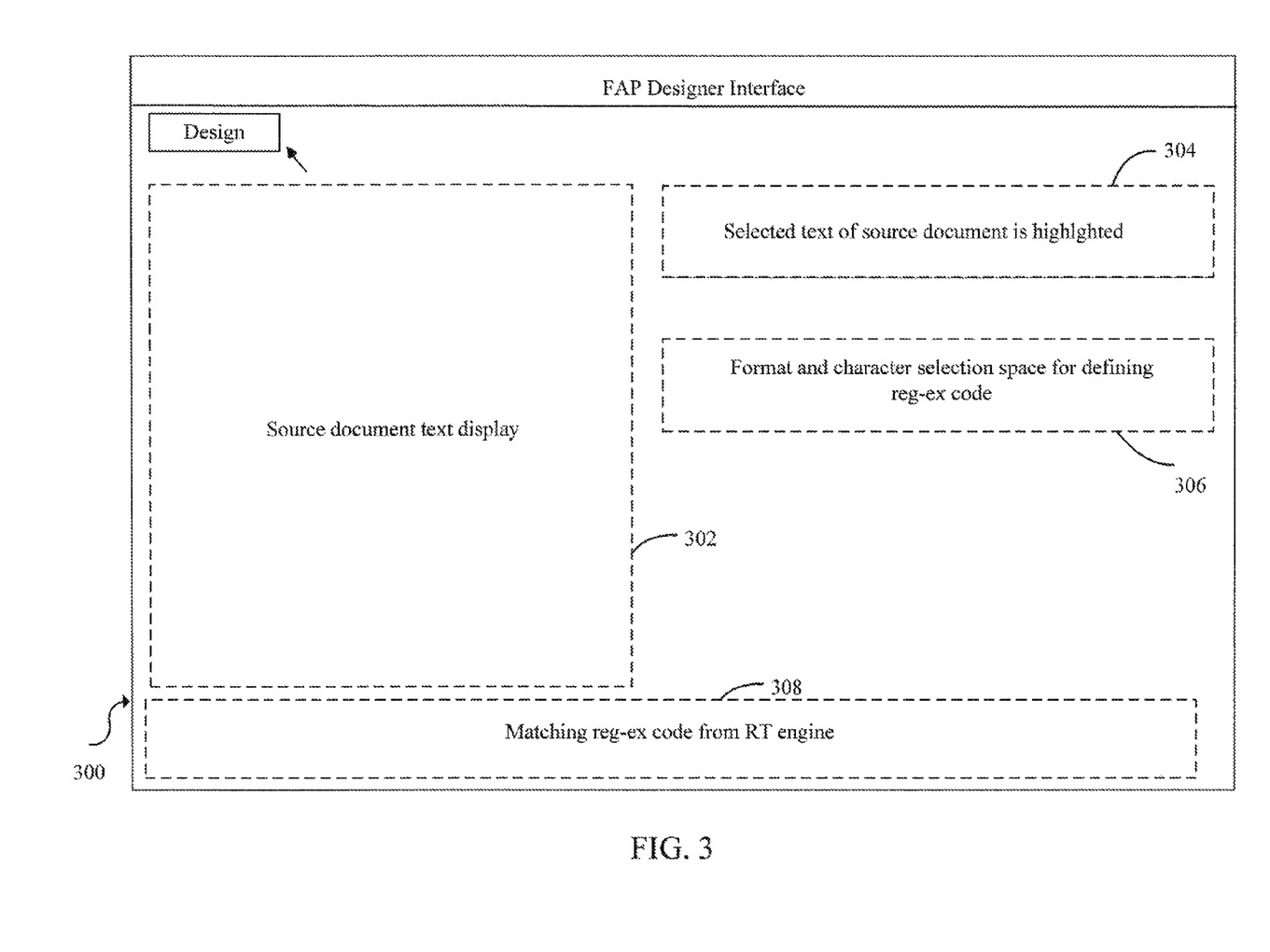
FIG. 3 is a web-based interface facilitated by a report generation system, in accordance with at least one embodiment.

FIG. 3 is a portion of a web-based interface 300 facilitated by the report generation system 108, in accordance with at least one embodiment. The source document received by the report generation system 108 appears on the web-based interface 300. The web-based interface 300 contains a document panel 302, a selection panel 304, a property panel 306, and a library panel 308. The document panel 302 displays the content of the source document received from the source system 102. In an embodiment, the document panel 302 displays the source document containing textual content. For defining the reg-ex code of the source document, the operator 106 interprets each line of text in the document panel 302 and selects a line of text for which the reg-ex code is to be defined. The selected text on the document panel 302 is displayed on the selection panel 304. The operator 106 uses options available on the property panel 306 to define properties of the text in the selection panel 304. In an embodiment, the properties of the text may include, but are not limited to, length, separating characters, etc, to be contained in the reg-ex code for the variable text. The library panel 308 displays on the selection panel 304 the reg-ex code previously generated for the similar or identical line of selected text in other source documents. In an embodiment, for example, the library panel 308 displays matching reg-ex codes and the corresponding text contained in previously created RTTs stored in a format access profile (FAP) library shown in FIG. 4.

Figure 4:
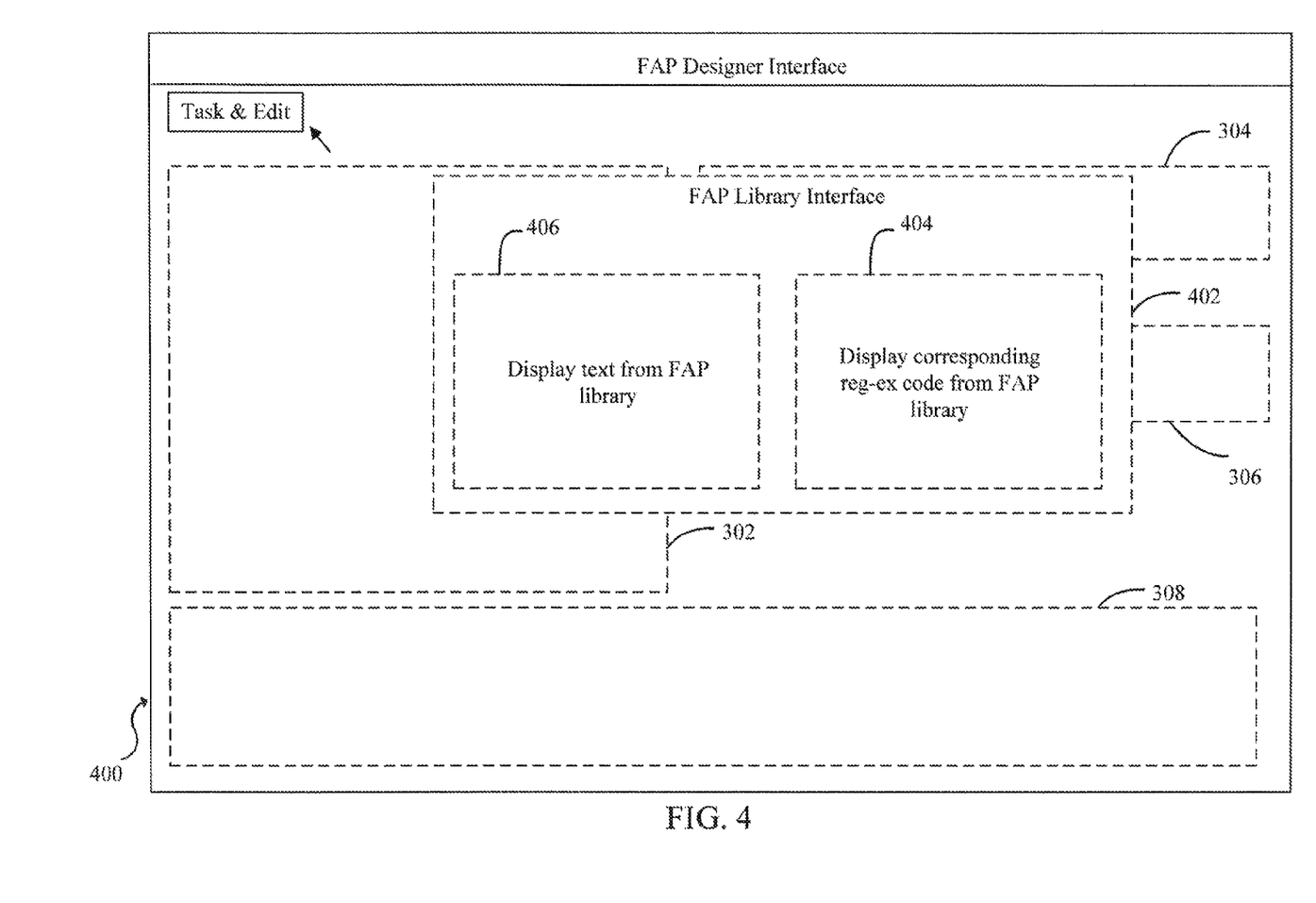
FIG. 4 is another web-based interface facilitated by a report generation system, in accordance with at least one embodiment.

FIG. 4 is another web-based interface portion 400 facilitated by the report generation system 108, in accordance with at least one embodiment. The web-based interface 400 includes a design panel 402. The design panel 402 contains a reg-ex code column 404 and a text column 406. For the text contained in the source document, the design panel 402 displays the reg-ex code defined by the operator 106 for the corresponding text. The operator 106 may choose to delete the reg-ex code defined for the text or add the defined reg-ex code to the FAP library. The operator 106 interprets the entire lines of text and defines the exact reg-ex codes for the whole text in the document panel 302 by looking at the design panel 402. The reg-ex codes for the whole text in the document panel 302 are combined to create the RTT of the source document.

Referring again to FIG. 2, the template module 214 saves the RTT created in the file data 228 and saves the information specific to the fixed text in the template data 230.

The reg-ex identifier 216 retrieves the RTT created by the operator 106 and the information specific to the fixed text from the template data 230. For the fixed text, the reg-ex identifier 216 sends a request to the translator 112 to perform the translation of the fixed text in the source language to the output language. After the fixed text is translated to the output language, the reg-ex identifier 216 saves the translated fixed text in the fixed text data 232.

The mapping module 218 retrieves the information regarding the fixed text and the variable text from the template data 230 and the fixed text data 232 and identifies a shaping requirement of the output document. The mapping module 218 performs the shaping of the source document to the output document based on the template data 230 and the fixed text data 232 by converting the reg-ex code into a textual representation in a specific format on the output document. The operator 106 identifies which column on the output document corresponds to which part of the defined reg-ex code. The mapping information for the reg-ex code is saved in the mapping data 234 and the same is reflected in the RTT. In an embodiment, by defining the width of the data type of the variable text, the corresponding mapping of the variable text onto a column on the output document is done automatically. In another embodiment, the operator 106 defines coordinates of each line of text while generating the reg-ex code for each line. The coordinates thus help in the easy identification of exact location of each line of translated text.

The translator module 220 retrieves the mapping data 234 of the updated RTT and performs a translation of the variable text in the RTT to the one or more output languages of the output document. The translation information of the variable text in the RTT is saved in the translated data 236. In an embodiment, the variable text in the RTT is translated by performing a translation dictionary look-up or phonetic transliteration. In an embodiment, the source document may be in a flowing report format, a tabular report format, and the like. Depending upon the type of format of the source document, the operator 106 will define the required output format by shaping the text in the source document to map to specific rows and columns in the RTT. In an embodiment, the specific mapping of the text in the source document to the required format in the RTT ensures that the formatting of the output document is as per requirements and that the alignment of the text in the output document is not disturbed.

The generation module 222 retrieves data from the template data 230, the fixed text data 232, the mapping data 234, and the translated data 236, and generates the output document. The generation module 222 generates the output document in the text format or the graphic format as per the requirement of the output document. The generated output document is made available as the output data 238.

The print module 224 prints the generated output document in the output data 238 by giving print instructions to the printing system 116.

Figure 5:
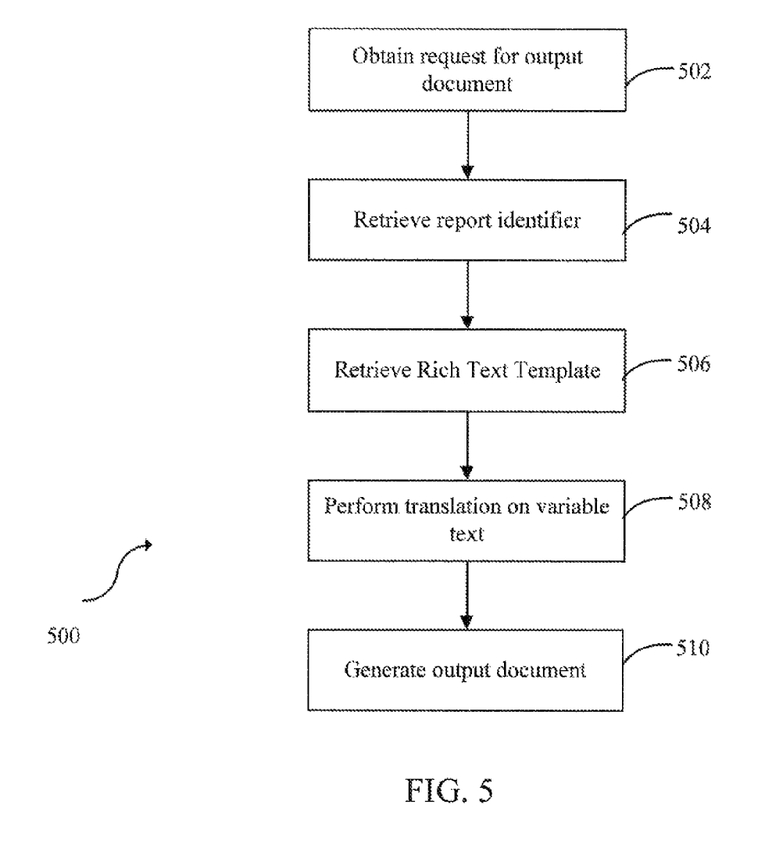
FIG. 5 is a flow diagram illustrating a method for transforming a document in the report generation system, in accordance with an embodiment.

FIG. 5 is a flow diagram 500 illustrating a method for transforming a document in the report generation system 108, in accordance with at least one embodiment.

At step 502, a request for the output document is obtained. In an embodiment, for example, the receiver module 212 of the report generation system 108 receives the request for the output document through the I/O terminal 204 when the user clicks on a printer icon on the source system 102. In this case, the user specifies the output language to which the source document has to be translated. In an embodiment, for example, the source document file type may include, but is not limited to, text file, PDF, HTML, MS Excel, RTF, CSV, and the like.

At step 504, the report identifier (ID) of the source document is retrieved. In an embodiment, for example, the receiver module 212 retrieves the report ID of the source document. The report ID is matched with the report ID of pre-stored RTTs to ascertain matching RTT of the source document. If the match is unsuccessful, the RTT of the source document is created at design time, which has been discussed in detail in conjunction with the explanation for FIG. 3 and hence will not be discussed in detail here.

At step 506, the RTT is retrieved. In an embodiment, for example, the reg-ex identifier 216 retrieves the RTT of the source document from the template data 230 and the translator 112 translates the fixed text of the source document as explained earlier. Since the translation of the fixed text does not require any formatting or shaping of the fixed text, it is preferably done by the translator 112. The translator 112 does not need to worry about the formatting and shaping.

At step 508, the variable text is translated. In an embodiment, for example, the translator module 220 translates the variable text in the RTT to the one or more output language requirements of the output document. The operator 106 sends a request to the mapping module 218 after generating the template data 230. The translator module 220 retrieves the mapping data 234 and translates the variable text by using at least one of a translation dictionary look-up, and a phonetic transliteration. As discussed earlier, the translation of the variable text may also require formatting or shaping of the text. Hence, it is performed by a program module such as the translator module 220 based on the template data 230 and format and shaping requirements configured by the operator 106.

At step 510, the output document is generated. In an embodiment, for example, the generation module 222 generates the output document from the translated RTT. The generation module 222 displays the translated RTT on a user interface (such as web-based interface 400) of the I/O terminal 204 or provides instructions to the print module 224 to print the generated output document in the format desirable.

In an operating example of the report generation system 108, the operator 106 receives a request to translate a source document to the output language. The operator views the request by clicking on an icon on the system tray. The operator 106 opens the source document and defines the fixed text and the variable text. The operator 106 also defines the placeholders for the variable text. This information is captured in the form of reg-ex code, and the RTT for the source document to the output document is generated. The fixed text of the RTT is sent for translation to the translator 112. The variable text is formatted and shaped by the mapping module 218 and then the variable text is translated by the translation module 220. The combined operation of formatting, shaping, and translation of the variable text transforms the variable text of the RTT to the desired output document. In an embodiment, the operator 106 manually provides the placeholders and the data types for the variable text of the RTT by looking up the RT Engine. The report generation system 108 uses this information provided by the operator 106 to format, shape, and translate the source document in order to generate the desired output document.

The disclosed methods and systems, as described in the ongoing description or any of its components, may be embodied in the form of a computer system. Typical examples of a computer system include, but are not limited to, a general-purpose computer, a programmed microprocessor, a microcontroller, a peripheral integrated circuit element, and other devices or arrangements of devices that are capable of implementing the steps that constitute the method of the present disclosure.

The computer system comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system may also include a communication unit. The communication unit allows the computer to connect to other databases and the Internet through an Input/output (I/O) interface, allowing the transfer as well as reception of data from other databases. The communication unit may include a modem, an Ethernet card, or any other similar device which enables the computer system to connect to databases and networks, such as LAN, MAN, WAN and the Internet. The computer system facilitates inputs from a user through an input device, accessible to the system through an I/O interface.

The computer system executes a set of instructions that are stored in one or more storage elements in order to process input data. The storage elements may also hold data or other information as desired. The storage element may be in the form of an information source or a physical memory element present in the processing machine.

The programmable or computer readable instructions may include various commands that instruct the processing machine to perform specific tasks such as the steps that constitute the method of the present disclosure. The method and systems described can also be implemented using only software programming or using only hardware or by a varying combination of the two techniques. The present disclosure is independent of the programming language used and the operating system in the computers. The instructions for the present disclosure can be written in all programming languages including, but not limited to 'C', 'C++' 'Visual C++' 'Visual Basic', 'VB.Net', 'C#.Net', 'ASP.Net', or 'Java'. Further, the software may be in the form of a collection of separate programs, a program module with a larger program or a portion of a program module, as in the present disclosure. The software may also include modular programming in the form of object-oriented programming. The processing of input data by the processing machine may be in response to user commands, results of previous processing or a request made by another processing machine. The present disclosure can also be implemented in various operating systems and platforms including, but not limited to, 'Microsoft Windows', 'Unix', 'DOS', 'Mac OS', 'Android', 'Symbian', and 'Linux'.

The programmable instructions can be stored and transmitted on a non-transitory computer readable medium. The programmable instructions can also be transmitted by data signals across a carrier wave. The present disclosure can also be embodied in a computer program product comprising a non-transitory computer readable medium, the product capable of implementing the above methods and systems, or the numerous possible variations thereof.

The method, system, and computer program product, as described above, have numerous advantages. Some of these advantages may include, but are not limited to, transformation of files in text format to rich-text format such as MS Word, without any loss of content. This may be advantageous for migrating from legacy systems which may have files in text format to modern systems to store rich-text file content. The format of the output document is decided by the user's operational requirement, and the methods stated earlier may be useful in such scenarios as on factory floors where only dot-matrix printers are used due to low-resolution printing. Furthermore, the user may choose one or more output languages for the one or more output documents wherein the translation cost may be significantly lower than systems that may require multiple runs of translations corresponding to the one or more output languages. In addition, this ensures that the generated output document in any language is properly formatted. Furthermore, the problem of versioning is overcome wherein any changes in the source document are immediately known to an administrator of the report generation system 108 by looking up the report ID of the source document, and the corresponding change is reflected in the RTT file for the translation as well. In addition, the complications that arise out of the difference in the number of pages of the source document and the output document is overcome by adjusting the formatting of the source document to match the one or more output languages of the one or more output documents. Furthermore, a single output document may be printed in one or more output languages without affecting the format of the output document.

Various embodiments of the methods and systems for transforming a first document in a first language to a second document in a second language have been disclosed. However, it should be apparent to those skilled in the art that many more modifications, besides those described, are possible without departing from the inventive concepts herein. The embodiments, therefore, are not to be restricted. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for transforming a first document in a first language to a second document in a second language, wherein the first document comprises a fixed text and a variable text, the method comprising:
   receiving a request for the second document;
   retrieving a unique identifier of the first document;
   retrieving a first file on the basis of the unique identifier,
   wherein the first file comprises a translation of the fixed text into a second language and is in a pre-decided format,
   wherein the first file is prepared by generating a regular expression code for the fixed text and the variable text in the first document, and
   wherein the fixed text and the variable text is identified during said generation of regular expression code;
   performing translation of the variable text from the first language to the second language, wherein the translation is performed on the basis of at least one of a translation dictionary look-up and a phonetic transliteration; and
   generating the second document on the basis of the first file and the at least one of the phonetic transliteration and the translation dictionary look-up, wherein the above steps are executed by a microprocessor.

2. The method of claim 1, wherein the first file is prepared by analyzing the fixed text and variable text in the first document.

3. The method of claim 1, wherein the first document is in a plain text format.

4. The method of claim 1, wherein retrieving the unique identifier of the first document comprises storing the first document.

5. The method of claim 1, wherein the first file is assigned the same unique identifier as the first document.

6. The method of claim 1, wherein the unique identifier is generated on the basis of at least one of a report name and a report ID.

7. The method of claim 1, wherein the pre-decided format is generated by analyzing the row and column size of the fixed and variable text in the first document.

8. The method of claim 1 further comprising maintaining a format access profile (FAP) library which contains one or more regular-expression codes of the first document.

9. The method of claim 1 further comprising generating the second document as one of a monolingual document and a bilingual document.

10. The method of claim 1, wherein the first document is monolingual.

11. The method of claim 1 further comprising selecting one or more data types of the variable text in the first document.

12. The method of claim 1 further comprising formatting the variable text in the first document based on representation of the variable text in the second document.

13. The method of claim 1 further comprising identifying a location of the variable text in the first document.

14. A system for transforming a first document in a first language to a second document in a second language, wherein the first document comprises a fixed text and a variable text, the system comprising:
   a memory comprising one or more program instruction modules, the one or more program instruction modules comprising:
      a receiver module configured for receiving the first document, wherein the first document comprises a unique identifier;
      a template module configured for retrieving a first file on the basis of the unique identifier,
      wherein the first file comprises a translation of the fixed text into a second language and is in a pre-decided format,
      wherein the first file is prepared by generating a regular-expression code for the fixed text and the variable text in the first document, and
      wherein the fixed text and the variable text is identified during said generation of regular expression code;
      a translator module configured for performing translation of the variable text from the first language to the second language, wherein the translation is performed on the basis of at least one of a translation dictionary look-up and a phonetic transliteration;
      a generation module configured for generating the second document on the basis of the first file and the at least one of the phonetic transliteration and the translation dictionary look-up;
      a print module configured for printing the generated second document; and
   a microprocessor operable to execute the one or more program instruction modules.

15. The system of claim 14, wherein the memory further comprises a regular-expression identifier configured for identifying one or more unique instances of the generated regular-expression code in the first file.

16. The system of claim 14, wherein the memory further comprises a mapping module configured for mapping the generated regular-expression code in the first file to a layout of the second document, wherein the layout of the second document corresponds to at least one of a page fitment, a column representation, and a font property.

17. A computer program product for use with a computer, the computer program product comprising a non-transitory computer-readable medium storing a computer-readable program code for transforming a first document in a first language to a second document in a second language, wherein the first document comprises a fixed text and a variable text, the computer-readable program code comprising:
   program instructions for retrieving a unique identifier of the first document;
   program instructions for retrieving a first file on the basis of the unique identifier, wherein the first file comprises a translation of the fixed text into a second language and is in a pre-decided format, wherein the first file is prepared by generating a regular-expression code for the fixed text and the variable text in the first document, and wherein the fixed text and the variable text is identified during said generation of regular expression code;

program instructions for performing translation of the variable text from the first language to the second language, wherein the translation is performed on the basis of at least one of a translation dictionary look-up and a phonetic transliteration; and program instructions for generating the second document on the basis of the first file and the at least one of the phonetic transliteration and the translation dictionary look-up.

* * * * *